United States Patent
Brown et al.

(10) Patent No.: US 9,407,499 B2
(45) Date of Patent: Aug. 2, 2016

(54) ENHANCED BYPASS OPERATION IN SIMULCAST RADIO COMMUNICATION SYSTEM

(71) Applicant: HARRIS CORPORATION, Melbourne, FL (US)

(72) Inventors: David William Brown, Concord, VA (US); Joseph J. Milhorn, Forest, VA (US)

(73) Assignee: Harris Corporation, Melbourne, FL (US)

( * ) Notice: Subject to any disclaimer, the term of this patent is extended or adjusted under 35 U.S.C. 154(b) by 42 days.

(21) Appl. No.: 13/934,686

(22) Filed: Jul. 3, 2013

(65) Prior Publication Data

US 2015/0009805 A1    Jan. 8, 2015

(51) Int. Cl.
*H04B 15/00* (2006.01)
*H04W 40/00* (2009.01)
(Continued)

(52) U.S. Cl.
CPC ........... *H04L 41/0672* (2013.01); *H04H 20/12* (2013.01); *H04H 20/67* (2013.01); *H04W 24/04* (2013.01); *H04W 76/002* (2013.01); *H04W 84/08* (2013.01)

(58) Field of Classification Search
CPC ....... H04W 40/00; H04W 84/08; H04W 4/06; H04L 12/18; H04L 29/06027; H04L 65/1036; H04L 65/103; H04L 67/1095; H04L 67/1008; H04L 12/24; H04L 41/0226; H04H 20/67; H04H 20/71
USPC ................................ 370/211, 221, 389, 95.1
See application file for complete search history.

(56) References Cited

U.S. PATENT DOCUMENTS 5,263,177 A * 11/1993 Schieve et al. ................ 455/503
5,365,569 A   11/1994 Witsaman et al.
(Continued)

FOREIGN PATENT DOCUMENTS

EP     1296530     3/2003
EP     2519056     10/2012

OTHER PUBLICATIONS

International Search Report and Written Opinion mailed Feb. 4, 2015 Application Serial No. PCT/US2014/045036 in the name of Harris Corporation.

(Continued)

*Primary Examiner* — Edan Orgad
*Assistant Examiner* — Vanneilian Lalchinthang
(74) *Attorney, Agent, or Firm* — Fox Rothschild LLP; Robert J. Sacco; Carol E. Thorstad-Forsyth

(57) ABSTRACT

An enhanced bypass mode simulcast radio communication system (200) includes a plurality of transmit/receive (T/R) sites ($210_1$, $210_2$, $210_3$) configured to participate in a simulcasting communication session responsive to a control point system (201). A site controller (211) is responsive to determination of a timing malfunction at a first one of the T/R sites. In response, the site controller is configured to automatically terminate participation of the malfunctioning T/R site in the simulcasting communication session and perform further actions to cause the malfunctioning site to transition to a multisite mode of operation involving a network switching center (202). The simulcast system automatically adjusts its site timing to compensate for the loss of the T/R site in bypass.

20 Claims, 4 Drawing Sheets

(51) Int. Cl.
  *H04B 1/00* (2006.01)
  *G06F 15/173* (2006.01)
  *H04J 3/16* (2006.01)
  *H04L 12/24* (2006.01)
  *H04W 24/04* (2009.01)
  *H04H 20/67* (2008.01)
  *H04W 84/08* (2009.01)
  *H04H 20/12* (2008.01)
  *H04W 76/00* (2009.01)

(56) References Cited

U.S. PATENT DOCUMENTS

| | | | |
|---|---|---|---|
| 5,384,776 A * | 1/1995 | Gulliford et al. | 370/438 |
| 5,448,758 A * | 9/1995 | Grube et al. | 455/503 |
| 5,742,907 A | 4/1998 | Brown | |
| 5,790,527 A * | 8/1998 | Janky et al. | 370/330 |
| 5,805,610 A * | 9/1998 | Illes et al. | 714/738 |
| 6,301,266 B1 | 10/2001 | Peterson et al. | |
| 6,304,558 B1 * | 10/2001 | Mysore | 370/312 |
| 7,092,730 B2 * | 8/2006 | Eberlein et al. | 455/502 |
| 8,291,110 B2 | 10/2012 | Pishevar et al. | |
| 2007/0184862 A1 * | 8/2007 | Hartless | 455/503 |
| 2012/0020270 A1 * | 1/2012 | Karaoguz et al. | 370/312 |

OTHER PUBLICATIONS

International Preliminary Report on Patentability dated Jan. 5, 2016 received in PCT/US2014/45036.

* cited by examiner

ENHANCED BYPASS OPERATION IN SIMULCAST RADIO COMMUNICATION SYSTEM

BACKGROUND OF THE INVENTION

1. Statement of the Technical Field

The inventive arrangements relate to communication systems, and more particularly to fault tolerant simulcast communication systems.

2. Description of the Related Art

Simulcast systems are frequently used in critical public safety communication applications. In a simulcast communication system, multiple remote transmit sites operate under the command of a common control point. The control point causes each transmit site to broadcast the same signal, on the same RF frequency, at the precise time necessary for simultaneous arrival of the signal in overlap regions. This arrangement allows a simulcast communication system to provide reliable communication over a broader geographic area than would otherwise be possible with a single transmitting station. Simulcast systems have many advantages but must contend with the problem of time delay interference (TDI), which involves signals from one transmit site destructively interfering with signals from other transmit sites. In order to control this problem, each remote transmit site will include a very precise timing system to facilitate synchronization of RF transmissions from each of the multiple transmit sites. Still, timing systems are a potential point of failure in simulcast communication systems and when a timing system fails, the remote transmit site can no longer function as part of the simulcast system. When this happens the malfunctioning transmit site will frequently engage a bypass mode of operation. In a bypass mode, the site functions in a way that is similar to an ordinary trunked repeater site to facilitate continued communications among mobile units within a coverage area of the malfunctioning transmit site. In this bypass mode, the transmit site operates in a way that is substantially autonomous relative to the remainder of the simulcast system. However, a dispatch console under these conditions will generally lose the ability to communicate with mobile units through the malfunctioning transmit site. The dispatch operator can revert to an auxiliary radio for communicating through the remote transmit site, but in so doing will lose the benefit of many advanced functions provided by the dispatch console.

SUMMARY OF THE INVENTION

Embodiments of the invention concern a simulcast radio communication system and method which offers enhanced bypass operation. A simulcast radio communication system includes a plurality of transmit/receive (T/R) sites configured to participate in a simulcasting communication session responsive to a control point system. A site control processor is responsive to determination of a malfunction (e.g. a timing malfunction) at a first one of the T/R sites. In response, the site control processor is configured to automatically terminate participation of the malfunctioning T/R site in the simulcasting communication session and perform further actions to cause the malfunctioning site to transition to a multisite mode of operation. The site control processor will initiate a communication with a network switching center (NSC) using a packet switched network. The purpose of the communication will be to register the malfunctioning T/R site with the NSC as a multisite communication node. When the T/R site is functioning in a multisite mode of operation, it will transmit at times and frequencies which are different from a remainder of the T/R sites which are still participating in the simulcasting communication session. The simulcast radio system can adjust its site timing to compensate for the altered RF propagation overlaps when the site is lost.

When the malfunctioning T/R site is operating in multisite mode, the NSC is advantageously configured to route communications between a dispatch console participating in the simulcasting communication session, and the malfunctioning T/R site. The NSC is also advantageously configured to route communications between the malfunctioning T/R site and the control point. Upon elimination of the malfunction, the site control processor causes termination of the multisite mode of operating by the first T/R site, and causes at least one message to be communicated from the T/R site to the control point system to re-establish normal participation of the site in the simulcasting communication session.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
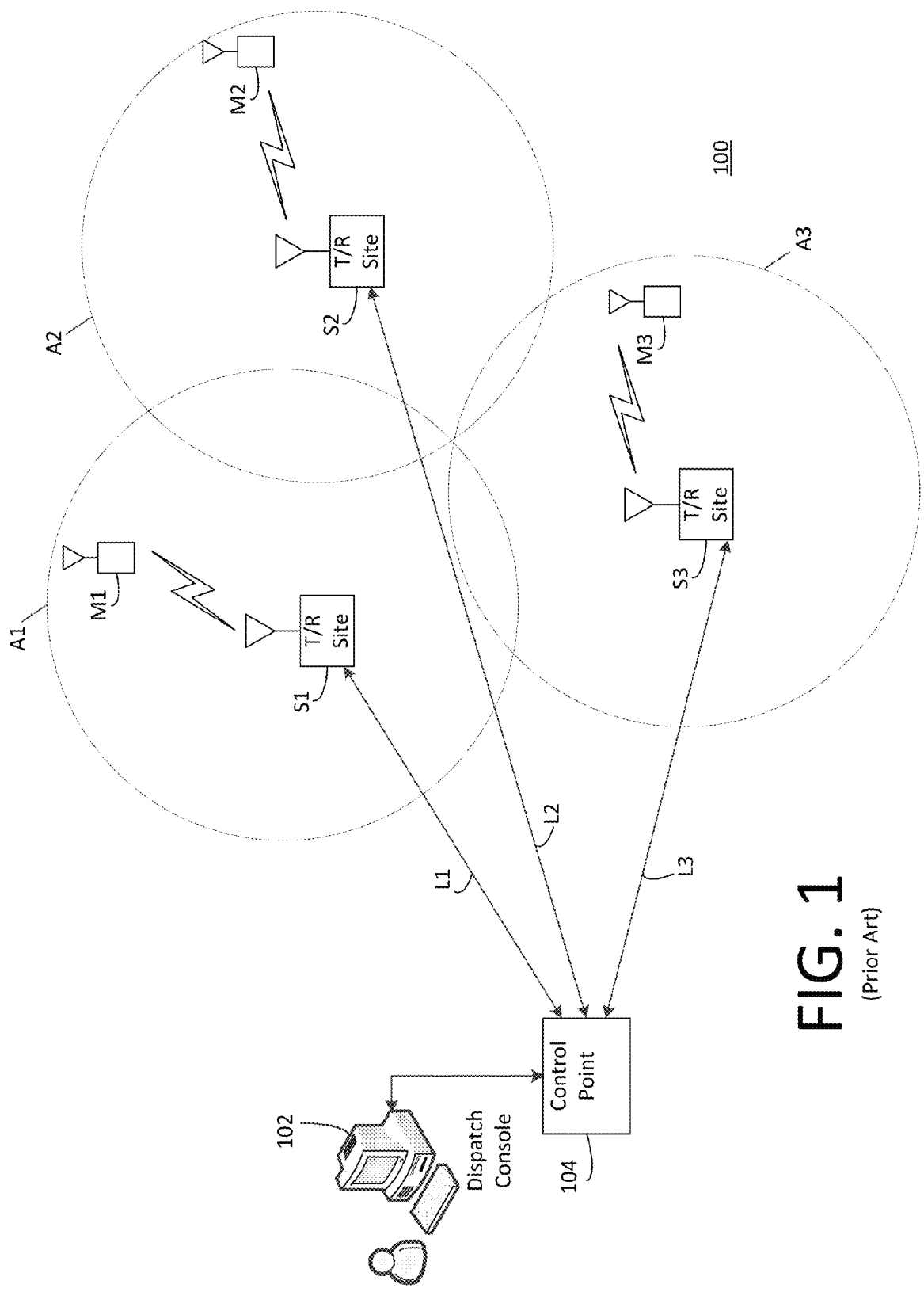
FIG. 1 is a diagram of a prior art simulcast communication system.

Referring now to FIG. 1 there is shown a typical simulcast type RF communication system 100. Simulcast RF systems are well known in the art and therefore will not be described here in detail. However, a brief overview of the operations of simulcast system 100 shall be provided for aiding in the understanding of the inventive arrangements. The communication system 100 includes three simulcasting transmit/receive sites (T/R sites) S1, S2 and S3. The transmissions of each site cover a predetermined geographic coverage area. For example, the T/R site S1 can cover area A1, T/R site S2 can cover area A2, and the T/R site S3 can cover area A3. A central control point 104 is communicatively coupled to each of the T/R sites S1, S2 and S3 by means of communication links L1, L2 and L3.

The control point 104 communicates substantially identical signals to each of the T/R sites where the signals are transmitted at a controlled time and on the same RF frequency to one or more mobile radio units within the coverage areas A1, A2 and/or A3. As used herein, a mobile radio unit or mobile unit can include a vehicle mounted radio system or a portable radio system carried by a user. A mobile unit M1, M2 and/or M3 can receive such outbound transmissions from a T/R site. As an example, a communication signal can originate with a dispatch console 102 and can be forwarded to the control point 104. The signal can be communicated from the control point to each of the T/R sites S1, S2, and S3. The communication can then be transmitted from each of the T/R sites, with appropriate timing offsets applied to the signal so as to minimize time delay interference.

The exemplary system described herein provides a digital control channel and a plurality of working channels. Accordingly, a request to communicate can be sent from the mobile unit (e.g. mobile unit M3) by transmitting a channel assignment request to a T/R site (e.g. T/R site S3) on an inbound control channel. When the channel assignment request is received by the T/R site, it is communicated to control point 104. The control point 104 responds by causing a control channel assignment message to be simultaneously transmitted using T/R sites S1, S2 and S3. The control channel assignment message is received by the mobile unit M (and any other mobile units that are "called" by that channel assignment. The mobile unit M and any other called mobile units respond to the channel assignment message by transitioning to a working RF frequency. The called radios then communicate using the working frequency until the termination of the communication session.

During a communication session, transmissions from a mobile unit (e.g. mobile unit M3) will be received at one or more of the T/R sites S1, S2 and S3. When received, each of these transmission is forwarded to the control point 104, where the signal with the best signal to noise ratio or lowest bit error rate is selected. That signal is then communicated back to each of the T/R sites where it is rebroadcast by each of the T/R sites so that it may be heard by other mobile units within coverage areas A1, A2 and/or A3. Upon completion of the communication session, the various mobile radios return to a state in which they continue to monitor the outbound control channel for additional control messages.

In order to prevent time delay interference, identical transmissions emanating from T/R sites S1, S2 and S3 must be time synchronized. The timing of each transmission is precisely adjusted relative to the other transmissions so as to minimize time domain interference. Various techniques are available for implementing such time synchronization. For example, a common technique is to use a global positioning system (GPS) satellite receiver at each T/R site for providing access to a common timing reference. Other systems for maintaining system timing are also possible.

In a simulcast system such as system 100, a known failure mode arises when one of the T/R sites (e.g. T/R site S1) is unable to maintain time synchronization with a remainder of the T/R sites. In such a scenario, the T/R site will enter a bypass mode of operation, and the control point 104 will adjust appropriately. When the fault or faults are corrected, the T/R site exits bypass mode and resumes simulcast operation. When a T/R site enters bypass mode it is said to be "orphaned". When orphaned, there are two bypass modes of operation that are possible. The site can "go dark" in which case it simply goes off the air. Communications in the site's coverage area are then dependent upon 'fill in' coverage from the adjacent simulcast sites. If the T/R site is allowed to simply "go dark," the control point 104 can continue to use all of its available channels for its remaining remote transmit sites. The benefit of this type of bypass plan is that all system features continue to be available for all users that are located in areas with coverage; the drawback is there may be some areas where no communication capability exists due to insufficient fill in coverage or too much time delay interference.

An alternative approach for dealing with orphaned T/R sites is to allow the orphaned site to stay on the air as an independent standalone repeater site, using some subset of the total available number of simulcast system channels. Accordingly, mobile to mobile radio communications within the coverage area of the orphan site can continue. In such a scenario, the control point 104 must remove the channels allocated to the orphaned T/R site from simulcast service to avoid interference with the operations of the other simulcast T/R sites. The benefit of the this approach is that full geographic coverage of service areas is maintained; the drawbacks are that (1) the users in the area covered by the orphaned site are cut off from the rest of the system and from multisite and console calls, and (2) the remaining simulcast system and the orphaned site each have a reduced number of channels. Because the users are cut off from normal console-based communications, a backup radio at the location of the console operator must be used by the console operator to communicate with the orphaned simulcast site.

Figure 2:
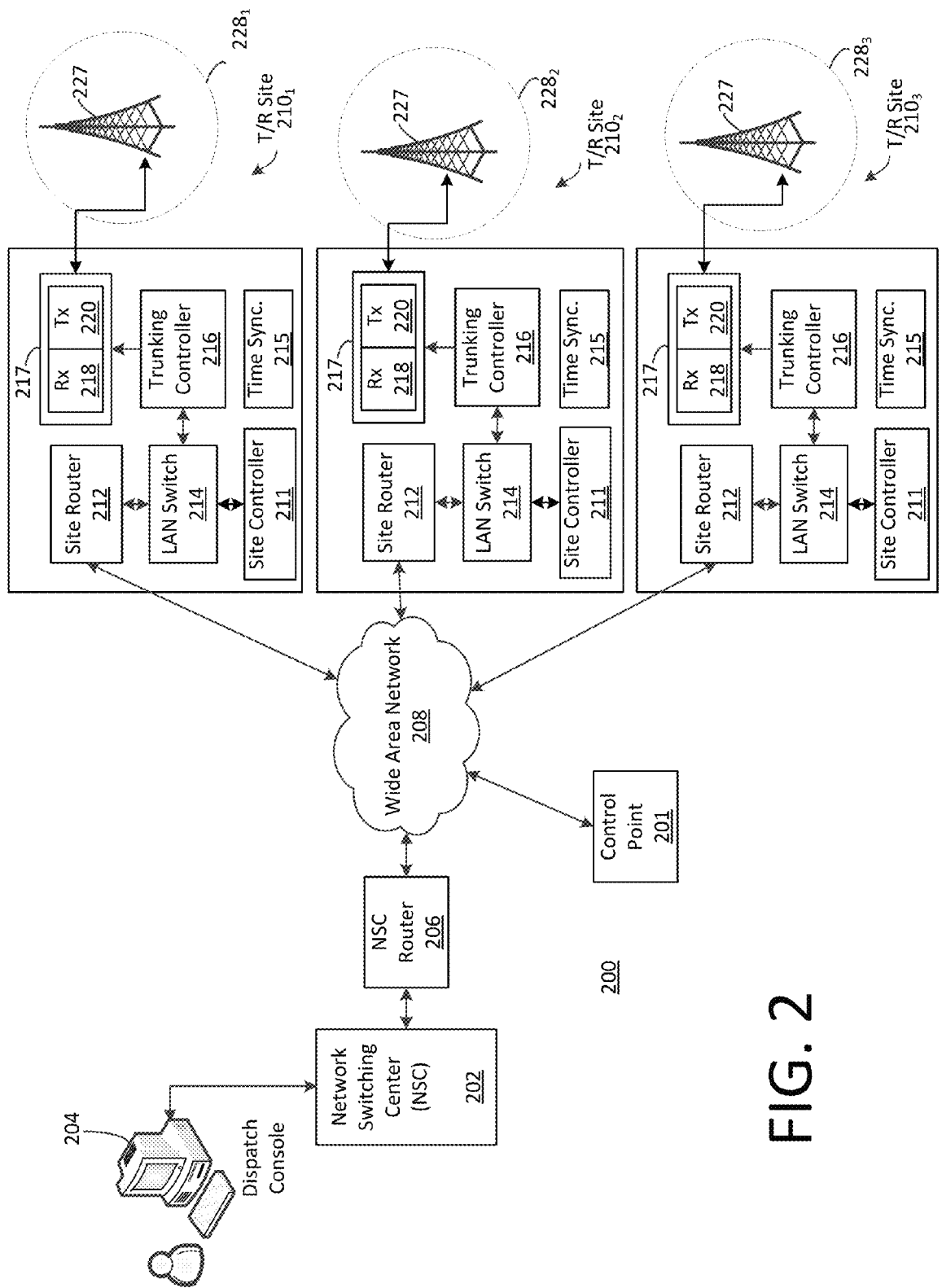
FIG. 2 is a block diagram of a simulcast communication system that is useful for understanding the invention.

Referring now to FIG. 2, there is shown an exemplary simulcast communication system 200. The communication system 200 provides enhanced features for avoiding certain problems associated with conventional bypass mode as outlined above. According to one aspect of the invention, the system 200 is a digitally trunked simulcast communication system. For example, the system 200 can use a control channel and a plurality of working channels.

System 200 includes a control point system 201 and a plurality of T/R sites $210_1$, $210_2$, $210_3$. Control point system 201 is configured to control simulcast operations of T/R sites $210_1$, $210_2$, $210_3$. As such, the control point system will communicate in real time substantially identical signaling (including digital control channel signaling and associated timing information) for transmission by the various T/R sites. The control point system will also evaluate received signals from mobile radio units (as provided by each of the T/R sites), and will select the received signal with best signal to noise ratio or lowest bit error rate. The control point system 201 will forward the selected signal to each of the T/R sites for retransmission. The control point system will also communicate the selected signal to a network switching center 202, which will direct the received voice data communication to the dispatch console 204. The control point system is preferably configured to support packet based communications (e.g. IP based packet communications). According to one embodiment, the control point can be configured to support trunking in accordance with a Project P25 (P25) communication protocol. The phrase Project 25 or P25, as used herein, refers to a set of system standards produced by the Association of Public Safety Communications Officials International (APCO), the National Association of State Telecommunications Directors (NASTD), selected Federal Agencies and the National Communications System (NCS). The P25 set of system standards generally defines digital radio communication system architectures capable of serving the needs of Public Safety and Government organizations.

In the exemplary embodiment shown, three T/R sites are provided, but the invention is not limited in this regard. Each T/R site includes several components for facilitating a digitally trunked simulcast communication system 200. For example, each T/R site advantageously includes a site router 212, a LAN switch 214, trunking controller 216, and an RF transceiver 217. Routers and LAN switches are well known in the art and therefore will not be described here in detail. However, it will be appreciated that site router 212 can receive packetized data communications from LAN switch and from the wide area network and route such packetized communications to an appropriate network destination address. LAN switch 214 directs packetized data communications received by the T/R site to the router, to one or more trunking controllers and/or to site controller 211.

The RF transceiver 217 will include a radio receiver 218 and radio transmitter 220. The radio receiver 218 and transmitter 220 are advantageously configured for receiving and transmitting RF signals in accordance with a predefined air interface protocol selected for communicating with mobile radio units. For example, the transceiver can be configured for implementing an air interface consistent with an industry standard P25 communication protocol. The phrase mobile radio units or mobile radio as used herein can include vehicular mounted radios and portable radio units which are carried by a user. Each T/R site $210_1$, $210_2$, $210_3$ will generally include one or more antennas 227 for communicating with mobile radio units in a respective communication coverage area $228_1$, $228_2$, $228_3$. The coverage areas in FIG. 2 are not shown to be overlapping, but it will be appreciated that such coverage areas would in fact overlap. For example, the coverage areas $228_1$, $228_2$, $228_3$ could overlap in a manner similar to that shown and described in relation to areas A1, A2 and A3 in FIG. 1. The trunking controller 216 at each T/R site is configured to facilitate trunked radio communications with mobile units in accordance with a trunked radio communication system protocol. Accordingly, communication sessions can in certain embodiments be instantiated using a control channel and can thereafter be maintained using one or more working channels. Trunking controllers are well known in the art and therefore will not be described here in detail. Each of the T/R sites can also include a site controller 211. In some embodiments, the site controller 211 can be a custom or general purpose computer processing device which is configured for controlling the operation of a particular T/R site as hereinafter described. However, the invention is not limited in this regard and the functions of the site controller can advantageously be implemented by the trunking controller 216. In such embodiments, the trunking controller and the site controller would be combined in a single processing system.

Each T/R site maintains time synchronization with the other T/R sites by means of a time synchronization unit 215. In some embodiments, the time synchronization unit 215 can include a global positioning system (GPS) satellite receiver for providing access to a common timing reference. GPS based time synchronization systems for simulcast communications are well known in the art and therefore will not be described here in detail. Other systems for maintaining time synchronization are also possible, and time synchronization units 215 can utilize any synchronization method now known or known in the future for purposes for synchronizing simulcast transmissions.

Control point system 201 communicates with the T/R sites $210_1$, $210_2$, $210_3$ by way of a suitable communication network, such as a wide area network 208. According to one aspect, wide area network 208 is advantageously selected to be a packet switched data network. Accordingly, when control point system 201 needs to communicate with the T/R sites $210_1$, $210_2$, $210_3$, it does so by transmitting one or more data packets which include header information specifying the network address of the various T/R sites. Similarly, when T/R sites $210_1$, $210_2$, $210_3$ wish to communicate with control point system 201, they each do so by transmitting one or more data packets including packet header information which specifies the network address of the control point system 201. A dispatch console 204 is communicatively coupled to the wide area network 208 by means of network switching center (NSC) 202 and an NSC router 206. The dispatch console facilitates communications between a dispatch operator and mobile radio units (not shown) in coverage areas $228_1$, $228_2$, $228_3$.

The network switching center 202 maintains a dynamic database of radios and consoles. This database includes information specifying which communication groups each radio is configured to participate in, which site each radio is using to communicate and the network address of each site. The NSC uses this database to forward call traffic to every site and console that needs the call data so that every member of the communication group can receive the communication.

When each of the T/R sites $210_1$, $210_2$, $210_3$ is functioning normally (no time synchronization faults), a voice communication originating at dispatch console 204 is packetized and communicated to the control point system 201. For example, this can be accomplished by including with each packet a network destination address associated with the control point system 201. The data packets are communicated from dispatch console 204 to NSC 202. The packets are then communicated through NSC router 206 and wide area network 208, to finally arrive at the control point system 201. Once received at control point system 201, the content of the data packets containing the voice communication are processed by the control point system 201 and communicated to each T/R site $210_1$, $210_2$, $210_3$ for transmission. These packets can be communicated to the T/R sites using conventional unicast packet communication methods in which the network address of the various T/R sites $210_1$, $210_2$, $210_3$ is specified as the destination address or using multicast type packet communication methods in which the various T/R sites join the multicast group which is the destination network address. The data packets are used at T/R sites to generate the voice communication signal. The voice communication signal is transmitted at each T/R site $210_1$, $210_2$, $210_3$ at substantially the same time, but with very small timing offsets selected to minimize time domain interference. Accordingly, the voice communication from the dispatch operator can be received and heard by operators of mobile units within each of the coverage areas $228_1$, $228_2$, $228_3$. Similarly data communication signals are routed through the NSC to the control point and signals for transmission are communicated to the T/R sites as a stream of data packets.

Voice and/or data communications from a mobile unit (not shown) are received at one or more of the T/R sites $210_1$, $210_2$, $210_3$ and forwarded to the control point system 201 using conventional packet based network communications. The control point system 201 compares the quality of the signals received at the various T/R sites and chooses the signal packets having the best signal quality. The selected packets are then communicated over the wide area network 208 from the control point system 201 to the dispatch console 204. Conventional packet communications are used for this purpose. At the dispatch console, the packetized data is used to reproduce the voice communication from the mobile unit for the benefit of the dispatch console operator. The selected received signal from the mobile unit can also be formatted for transmission in accordance with a predetermined air interface protocol and communicated over the wide area network 208 to each of the T/R sites $210_1$, $210_2$, $210_3$. Upon arrival at each of the T/R sites, the packetized data is transmitted (simulcasted) by the T/R sites. This transmission is provided so that the received signal from the mobile unit can be received by other mobile units within coverage areas $228_1$, $228_2$, $228_3$.

Trunking operations for system 200 can be configured in accordance with any trunking system protocol now known or known in the future for establishing a digitally trunked simulcast communication system. Accordingly, system 200 can make use of various control channels to set up calls and establish working channels as is known. Some of these trunking operations can be managed by control point 201 and trunking controllers 216 provided in the respective T/R sites $210_1$, $210_2$, $210_3$. The particular trunking protocol used is not critical to the invention.

One or more of the T/R sites $210_1$, $210_2$, $210_3$ can experience a timing fault such that the particular T/R site can no longer maintain time synchronization necessary for simulcast operations. For example, a timing fault can occur when time synchronization unit 215 fails to provide proper timing information for a particular T/R site. In the event of such a timing failure, the particular T/R site which has lost synchronization can no longer participate in simulcast communications as it will cause time delay interference with other nearby T/R sites. Accordingly, when such a timing failure is detected, communication system 200 will automatically be dynamically reconfigured.

Assume that a timing fault occurs at T/R site $210_1$. Upon detecting the occurrence of such timing fault, the site controller 211 for that site will determine that the T/R site $210_1$ can no longer participate in simulcast communications. Accordingly, the site controller 211 at T/R site $210_1$ will communicate to control point system 201 that T/R site $210_1$ is going off-line. The site controller 211 will also initiate a process by which T/R site $210_1$ is automatically reconfigured to operate in a multisite mode. For example, T/R site $210_1$ will be allocated a limited number of the existing channels which are available to the simulcast system 200 for communicating with mobile units in coverage areas $228_1$, $228_2$, $228_3$. Control point system 201 will be aware that T/R site $210_1$ has been allocated the selected sub-set of available channels and will control or communicate with T/R sites $210_2$, $210_3$ to ensure that the sub-set of available channels now allocated exclusively to T/R site $210_1$ will no longer be used by the remaining T/R sites that comprise the simulcast system.

Upon detection of the timing fault, the site controller 211 for T/R site $210_1$ will also initiate a packet based communication with NSC 202 to alert the NSC that T/R site $210_1$ wishes to join communication system 200 as a multisite communication node. The NSC 202 will respond by initiating a multisite session with T/R site $210_1$. Once the T/R site $210_1$ has established a multisite session with NSC 202, it continues operating in that manner until the multisite session has been terminated, at which point it can rejoin system 200 as part of the simulcast system.

When participating in the communication network 200 as a multisite node, the T/R site $210_1$ no longer routes received communications from mobile radio units to the control point system 201. Because the T/R site $210_1$ lacks time synchronization capability, it is no longer a participating node in the simulcast communication session managed by control point system 201. Similarly, when control point system 201 receives voice or data messages from dispatch console 204, it does not forward such communications to T/R site $210_1$ for re-transmission. Instead, such messages are routed by control point system 201 only to T/R sites $210_2$, $210_3$ which are still participating in the simulcasting session.

When T/R site $210_1$ is participating in network 200 as a multisite node, it uses the wide area network 208 to direct received communications from mobile units directly to the NSC 202. These received communications are then forwarded by NSC 202 to the dispatch console so that the communication can be reproduced for the benefit of the dispatch console operator. Accordingly, the dispatch console operator can listen to communications from mobile units received by T/R site $210_1$. Similarly, because T/R site $210_1$ has established itself as a multisite node in a communication session involving network switching center 202, voice and data communications that originate with dispatch console 204 can be forwarded by NSC 202 to T/R site $210_1$. These communications are broadcast by T/R site $210_1$ on one of its allocated communication channels so that the communication from the dispatcher can be received by operators of mobile radio units within coverage area $228_1$.

With the dynamic network reconfiguration as described herein, a dispatch console operator can continue to communicate with mobile units in a coverage area $228_1$ when a T/R site has a time synchronization failure. Notably, such communications are facilitated without resorting to conventional bypass procedures in which the console operator must use a radio at dispatch console 204 to communicate in separate communication sessions with users in coverage area $228_1$. Accordingly, the dispatch console operator can take full advantage of communication functions and features available at his dispatch console 204 when communicating with the malfunctioning T/R site.

In certain scenarios, a user in a coverage area $228_1$ will wish to communicate with a user in coverage area $228_2$ or $228_3$. Accordingly, NSC 202 can selectively route communications between one or more nodes participating in network 200 as part of the simulcast communication session to one or more nodes that are participating in network 200 as multisite nodes. For example, a user in coverage area $228_1$ can transmit a voice or data message to T/R site $210_1$. This voice or data message is communicated by the T/R site $210_1$ to the NSC 202. The NSC 202 determines that certain users who are intended recipients of the voice communication are logged into the network 200 but are physically located in a coverage area $228_2$ or $228_3$ so are logged in via control point 201. Accordingly, the communication originating from a mobile radio in coverage area $228_1$ can be forwarded by NSC 202 to control point system 201. The control point system 201 forwards the communication to T/R sites $210_2$ and $210_3$ where the message is simulcast using RF communication channels allocated to the simulcast communication session.

Conversely, a user in coverage area $228_2$ or $228_3$ may wish to communicate with a user in coverage area $228_1$. In such a scenario, a communication message will be received by one or both of T/R sites $210_2$, $210_3$ and forwarded to control point system 201. Control point system 201 will communicate the message to NSC 202 where the message will be provided to the dispatch console. The message will also be forwarded by the NSC 202 to node $210_1$ participating with NSC 202 in a multisite communication session. The node $210_1$ will then transmit the message using its allocated frequencies so that the message can be received by mobile radio units in coverage area $228_1$. Accordingly, users participating in the simulcast communication session involving nodes $210_2$, $210_3$ can communicate with users participating in a multisite session involving node $210_1$.

The foregoing arrangement will now be described in further detail with respect to the flowchart 300 shown in FIG. 3. The process begins at 302 and continues to step 304 in which a T/R site (e.g. T/R site $210_1$, $210_2$, $210_3$) is participating in a simulcast communication session. At 306, a determination is made as to whether a T/R site fault has been detected. For example, this determination can be made by a site controller (e.g. site controller 211). For purposes of the present invention, such a fault will usually involve a timing system fault that prevents the T/R site from participating in the simulcast communication session. Still, the invention is not limited in this regard and other types of T/R site faults may also be evaluated for purposes of step 306. If no T/R site fault is detected at 306, then the T/R site continues as before by participating in a simulcasting communication session. However, if a T/R site fault is detected (306: Yes) then the process continues on to 308 at which point participation of the malfunctioning T/R site (e.g. T/R site $210_1$) in the simulcast communication session is terminated. At 310, the malfunctioning T/R site communicates with the NSC 202 to register the malfunctioning T/R site as a multisite communication node.

The multisite registration process can involve several steps including the bootup step in which the T/R site $210_1$ announces its new operating mode to the Network Switching Center 202 to initiate the connection, call and unit database synchronization from the Network Switching Center 202 to the T/R site $210_1$ and unit registration information from the T/R site $210_1$ to the Network Switching Center 202.

At 312, the malfunctioning T/R site is automatically reconfigured to function in a multisite mode. In the multisite mode of operation, the T/R site transmits at times and frequencies which are different from the other T/R sites that are still participating in the simulcasting communication session. In this mode, the malfunctioning T/R site is also configured to communicate with NSC 202 for purposes of routing communications between malfunctioning T/R site and selected elements of simulcast network. For example, data comprising voice transmissions received by T/R site $210_1$ can be communicated to NSC 202 where it can be directed as needed to various remaining elements of the simulcast communication system (e.g. dispatch console 204 or control point system 201. Of course, multisite communications can also be directed to another multisite type RF site (not shown in FIG. 2) which is connected to the wide area network 208 but is not part of the simulcast system. Communications with this other multisite type RF site would be analogous to communications with the console 204 as described herein.

The process continues on to 314 where the malfunctioning T/R site now operates in multisite mode, and communicates with elements of the simulcast communication network (e.g. dispatch console 204) through the NSC. More particularly, voice communications received from mobile units in a coverage area of the malfunctioning T/R site will be communicated to the dispatch console through NSC 202. Voice communications from the dispatch console will be communicated through the NSC to the malfunctioning T/R site. Voice communications received by the malfunctioning T/R site can also be routed by the NSC to the control point system 201. The control point system 201 will provide this voice data to the T/R sites still participating in a simulcasting communication session whereby the voice data can be transmitted to mobile units within their respective coverage areas. Conversely, voice communications data received from mobile units by the T/R sites that are still participating in the simulcasting session can be directed by the NSC to dispatch console 204 and/or to the malfunctioning T/R site operating in multisite mode.

At 316 a determination is made as to whether the T/R site fault has been corrected. If not, the malfunctioning T/R site continues to operate in multisite mode as described. However, if it is detected that the T/R site fault has been corrected, then the process continues on to step 318 at which point the previously malfunctioning T/R site terminates its multisite operational mode. The process then continues on to 320 where the T/R site communicates with the control point system (e.g., control point system 201) to re-establish participation of the T/R site in the simulcast communication session. At 322, the T/R site is reconfigured to function in a simulcast mode in preparation for participating in the simulcast communication session. When the T/R site resumes synchronized broadcasting of outbound signals and messaging to the control point 201, this can serve as a trigger to cause the control point to return to simulcast service the channels that were previously being used by the T/R site while in multicast mode. At 324 a determination can be made as to whether the process is to be terminated for any reason. If so, then the process ends at 326. Otherwise, the process returns to 304 where the T/R site resumes its participation in the simulcasting communication session.

Figure 3:
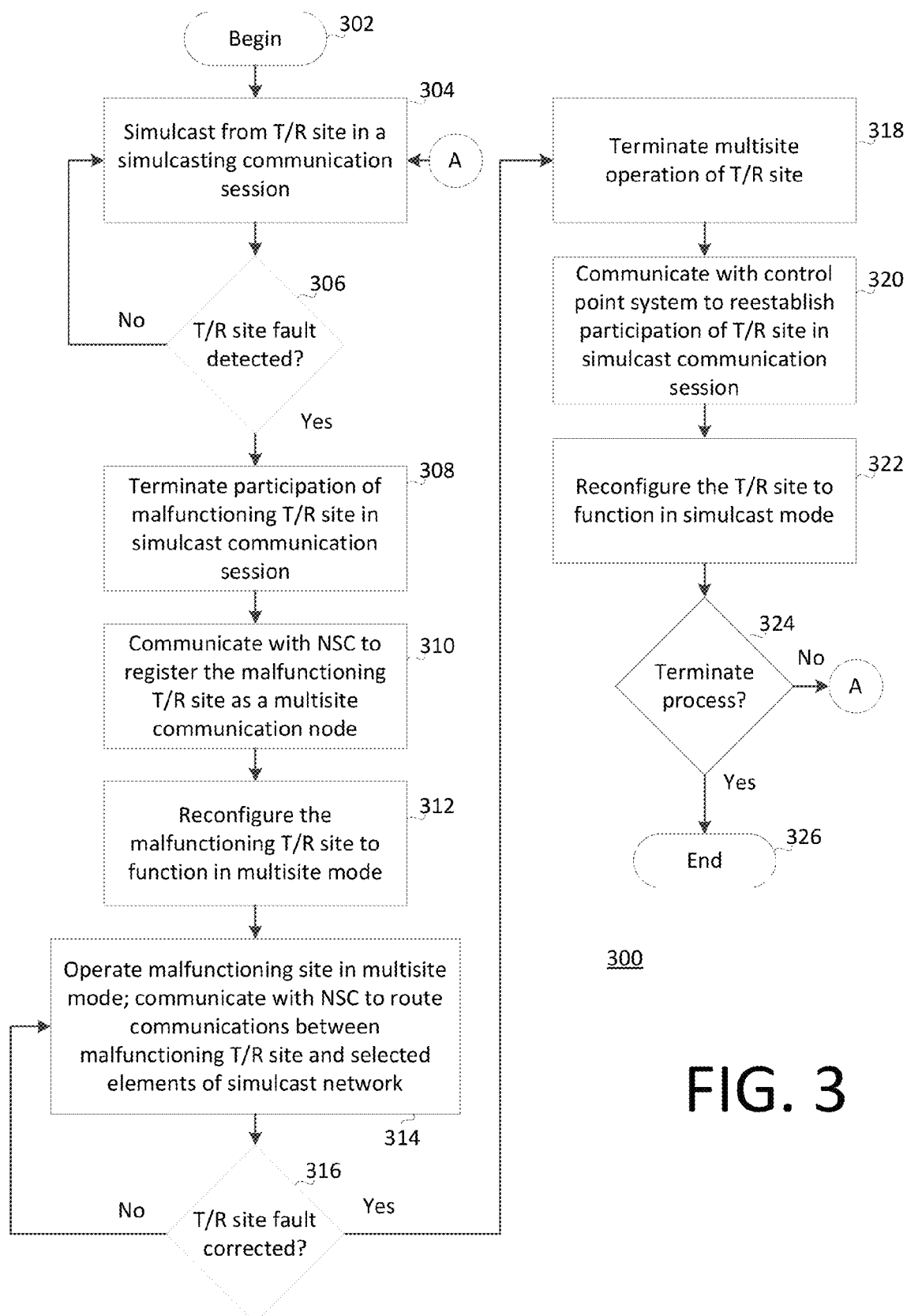
FIG. 3 is a flowchart that is useful for understanding the invention.

One or more of the steps described in FIG. 3 can be performed by site controller 211. The site controller 211 can be realized in one computer system or in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein. Alternatively, a site controller 211 can be integrated as part of a trunking controller 216 so that the functions of the site controller as described herein are carried out by the trunking controller. Accordingly, the site controller 211 and the trunking controller can comprise the same processing element.

As noted above, the site controller 211 for a particular site will determine when the T/R site $210_1$ can no longer participate in a simulcast communication. The T/R site will then communicate to the control point system 201 that it is going off-line as a simulcast participant site, and will initiate a process by which the T/R site $210_1$ is automatically reconfigured to operate in a multisite mode. Notably, when operating in such multisite mode the particular T/R site $210_1$ will no longer be configured for transmitting synchronously with the remaining T/R sites $210_2$, $210_3$. Accordingly, the potential for time domain interference caused by transmission from T/R site $210_1$ in a communication coverage area $228_2$, $228_3$ is substantially eliminated. Under these circumstances it is advantageous for the remaining T/R sites $210_2$, $210_3$ to adjust or shift their synchronized time setting to compensate for the new coverage area overlap situation due to the missing T/R site (e.g., T/R site $210_1$) in the simulcast session. Consequently, once the control point system 201 has been informed that a particular T/R site $210_1$ is no longer going to participate in a simulcast communication session, it can advantageously initiate such a modification in the time synchronization settings applied at each T/R site $210_2$, $210_3$. In an embodiment of the invention, the control point system 201 can send a message to each T/R site $210_2$, $210_3$ informing these sites that a particular T/R site $210_1$ is no longer participating in the simulcast communication session. The remaining T/R sites still participating in the simulcast communication session (e.g., T/R site $210_2$, $210_3$) can then access a previously determined time synchronization table stored in memory which contains time offsets or synchronization values most advantageous to the current scenario. A different synchronization table can advantageously be used at each of the remaining T/R sites depending on which particular T/R site has temporarily exited from the simulcast system. In other words, the remaining simulcast sites can adjust their synchronized time setting to compensate for the altered propagation and overlap regions when the one site is in bypass. These altered time settings would be preconfigured alternate settings that are in a table at each site and such alternate time synchronization settings are advantageously called into action when a T/R site failure triggers a bypass situation.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Figure 4:
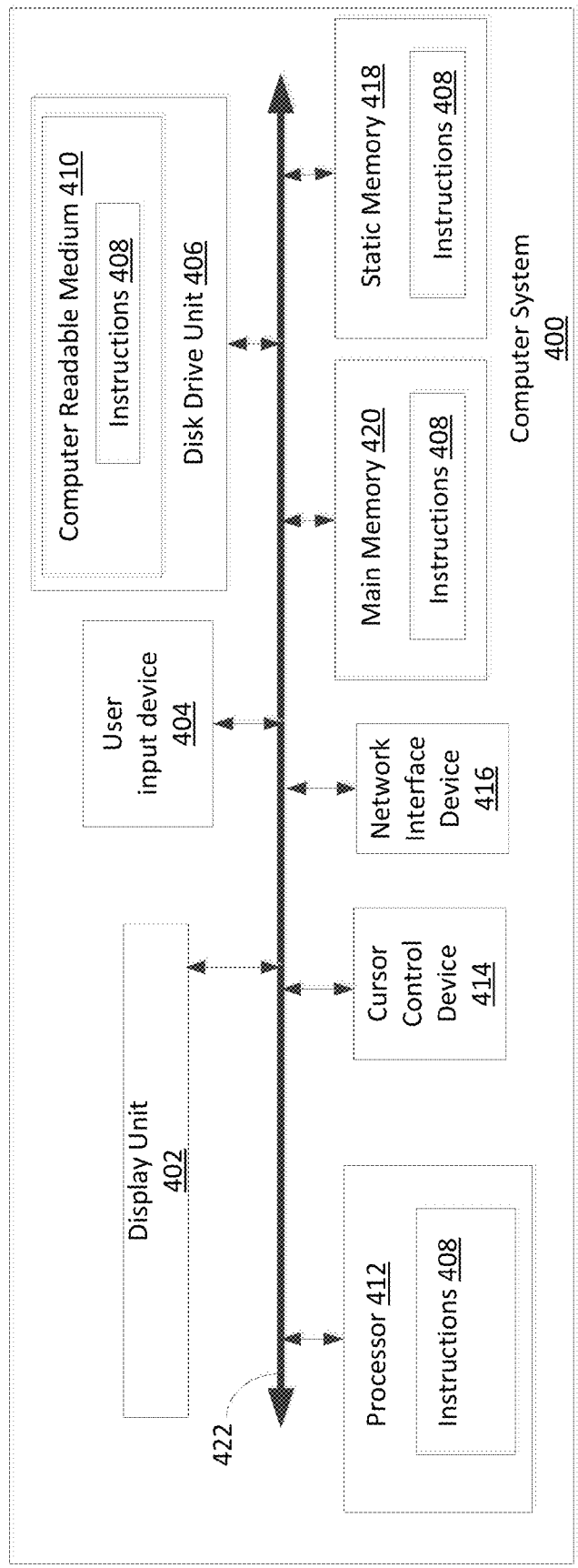
FIG. 4 is a block diagram of a computer system that is useful for understanding the invention.

Referring now to FIG. 4, there is shown a computer system 400 which can be used for the site controller 211. A similar computer system can also be used to implement the functions of control point system 201 and dispatch console 204. The computer system 400 includes a processor 412 (such as a central processing unit (CPU), a disk drive unit 406, a main memory 420 and a static memory 418, which communicate with each other via a bus 422. The computer system 400 can further include a display unit 402, such as a video display (e.g., a liquid crystal display or LCD), a flat panel, a solid state display, or a cathode ray tube (CRT)). The computer system 400 can include a user input device 404 (e.g., a keyboard), a cursor control device 414 (e.g., a mouse) and a network interface device 416.

The disk drive unit 406 includes a computer-readable storage medium 410 on which is stored one or more sets of instructions 408 (e.g., software code) configured to implement one or more of the methodologies, procedures, or functions described herein. The instructions 408 can also reside, completely or at least partially, within the main memory 420, the static memory 418, and/or within the processor 412 during execution thereof by the computer system. The main memory 420 and the processor 412 also can constitute machine-readable media.

Those skilled in the art will appreciate that the computer system architecture illustrated in FIG. 4 is one possible example of a computer system that can be used to implement the site controller 211. However, the invention is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations. Furthermore, software implementations can include, but are not limited to, distributed processing, component/object distributed processing, parallel processing, virtual machine processing, which can also be constructed to implement the methods described herein.

While the computer-readable storage medium 410 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for enhanced bypass operation in a simulcast radio communication system, comprising:

conducting a simulcasting communication session in which a common signal is broadcast wirelessly at the same frequency synchronously from a plurality of transmit/receive (T/R) sites to a plurality of mobile radio units dispersed in a plurality of coverage areas respectively associated with each of the T/R sites;

using a packet switched network to communicate simulcast communications from a control point system to the plurality of T/R sites participating in the simulcasting communication session, where the control point system controls simulcast operations of the plurality of T/R sites;

facilitating dispatch communications by using the packet switched network to receive at the control point system dispatch data originating from a dispatch console and to communicate the dispatch data from the control point system to the plurality of T/R sites participating in the simulcasting communication session;

responsive to a determination of a malfunction at a first T/R site of said plurality of T/R sites, terminating participation of said first T/R site in said simulcasting communication session, without disabling the simulcasting communication session in progress at a remainder of the plurality of T/R sites, dynamically reconfiguring said first T/R site to function in a multisite mode of operation in which said first T/R site transmits data to the mobile radio units within the coverage area of the first T/R site during a non-simulcast communication session established with a network switching center (NSC), where the data from the first T/R site is transmitted to the mobile radio units in its coverage area asynchronously and at different frequencies relative to the times and frequencies employed by the remainder of said T/R sites still participating in said simulcasting communication session;

automatically registering said first T/R site as a multisite T/R communication site with the (NSC) remote from and in communication with said control point system via said packet switched network; and when the first T/R site is operating in the multisite mode, selectively suspending communication of the dispatch data from the control point system to the first T/R site, and instead addressing said dispatch data from the NSC to the first T/R site when said dispatch data is intended for mobile radio units in a coverage area of the first T/R site.

2. The method according to claim 1, wherein the dispatch communications further comprise
communicating said dispatch data from the dispatch console to said NSC;
communicating a plurality of data packets comprising said dispatch data from said NSC to said packet switched network;
receiving said dispatch data in at least one of said plurality of T/R sites; and
transmitting with at least one of said plurality of T/R sites a RF transmission comprising said dispatch data.

3. The method according to claim 2, further comprising specifying a destination address of said plurality of data packets to be a network address of said control point system if said dispatch data is intended for transmission by said plurality of T/R sites participating in said simulcasting communication session.

4. The method according to claim 3, further comprising communicating over said packet switched network said dispatch data from said control point system to said plurality of T/R sites participating in said simulcasting communication session.

5. The method according to claim 2, further comprising specifying a destination address of said plurality of data packets to be a network address of said first T/R site when said first T/R site is operating in said multisite mode.

6. The method according to claim 1, further comprising:
receiving a radio transmission at one or more of said plurality of T/R sites; and
communicating from said one or more T/R sites to said packet switched network a plurality of data packets including data comprising said radio transmission.

7. The method according to claim 6, wherein said radio transmission is received at one of said T/R sites participating in said simulcasting communication session, and wherein said communicating of said plurality of data packets from said T/R site further comprises specifying said control point system as the network destination address for said plurality of data packets.

8. The method according to claim 7, further comprising communicating using said packet switched network said data comprising said radio transmission from said control point system to said NSC.

9. The method according to claim 8, further comprising selectively communicating said data comprising said radio transmission from said NSC to said first T/R site when said T/R site is operating in said multisite mode.

10. The method according to claim 6, wherein said radio transmission is received at said first T/R site operating in said multisite mode, and wherein said communicating of said plurality of data packets from said T/R site further comprises specifying said NSC as a destination address for said plurality of data packets.

11. A method for enhanced bypass operation in a simulcast radio communication system, comprising:
simulcasting from a plurality of transmit/receive (T/R) sites in a simulcasting communication session in which a common signal is broadcast wirelessly at the same frequency synchronously from a plurality of transmit/receive (T/R) sites to a plurality of mobile radio units dispersed in a plurality of coverage areas respectively associated with each of the T/R sites, said T/R sites responsive to a control point system which controls simulcast operations of the plurality of T/R sites;
facilitating dispatch communications by using a packet switched network to receive at the control point system dispatch data originating from a dispatch console and to communicate the dispatch data from the control point system to the plurality of T/R sites participating in the simulcasting communication session;
responsive to a determination of a malfunction at a first T/R site of said plurality of T/R sites, automatically:
terminating participation of said first T/R site in said simulcasting communication session, without disabling the simulcasting communication session in progress at a remainder of the plurality of T/R sites;
communicating with a network switching center (NSC) using the packet switched network to register said first T/R site with the NSC as a multisite communication node, where the NSC is located remote from and in communication with the control point system via the packet switched network;
reconfiguring said first T/R site to function in a multisite mode of operation in which said first T/R site transmits data during a non-simulcast communication session established with the NSC, where the data is transmitted at times and frequencies which are different from those employed by the remainder of said T/R sites participating in said simulcasting communication session; and
when the first T/R site is operating in the multisite mode, selectively suspending communication of the dispatch data from the control point system to the first T/R site, and instead addressing said dispatch data from the NSC to the first T/R site when said dispatch data is intended for mobile radio units in a coverage area of the first T/R site.

12. The method according to claim 11, further comprising using said NSC to route communications between the dispatch console participating in said simulcasting communication session, and said first T/R site operating in said multisite mode.

13. The method according to claim 11, further comprising using said NSC to route communications between said first T/R site operating in said multisite mode, and said control point.

14. The method according to claim 11, further comprising responsive to elimination of said malfunction automatically terminating said multisite mode of operating by said first T/R site, and communicating at least one message from said first T/R site to said control point system to re-establish participation of said first T/R site in said simulcasting communication session.

15. A simulcast radio communication system with enhanced bypass operation, comprising:

a plurality of transmit/receive (T/R) sites participating in a simulcasting communication session in which a common signal is broadcast wirelessly at the same frequency synchronously from a plurality of transmit/receive (T/R) sites to a plurality of mobile radio units dispersed in a plurality of coverage areas respectively associated with each of the T/R sites;

each of said plurality of T/R sites responsive to a control point system controlling simulcast operations thereof, said control point system facilitating dispatch communications by using the packet switched network to receive dispatch data originating from a dispatch console and to communicate the dispatch data from the control point system to the plurality of T/R sites participating in the simulcasting communication session;

a site control processor provided at each of said plurality of T/R sites, each responsive to determination of a malfunction at a respective T/R site of said plurality of T/R sites where said site control processor is located, each said site control processor automatically:

terminating participation of said respective T/R site in said simulcasting communication session when said respective T/R site is determined to be malfunctioning, without disabling the simulcasting communication session in progress at a remainder of the plurality of T/R;

communicating with a network switching center (NSC) using a packet switched network to register said respective T/R site that is malfunctioning with the NSC as a multisite communication node, the NSC being located remote from and in communication with the control point systems via the packet switched network;

reconfiguring said respective T/R site which is malfunctioning to function instead in a multisite mode of operation in which said respective T/R site transmits data to the mobile radio units within the coverage area of the respective T/R site during a non-simulcast communication session established with the NSC, where the data is transmitted at times and frequencies which are different from those employed by the remainder of said T/R sites still participating in said simulcasting communication session; and wherein said control point system selectively suspends communications of the dispatch data to the respective T/R site when said T/R site is in said multisite mode of operation, and said NSC instead addresses said dispatch data to the respective T/R site when the dispatch data is intended for the mobile radio units in the coverage area of the respective T/R site.

16. The system according to claim 15, wherein said NSC routes communications between the dispatch console participating in said simulcasting communication session, and said respective T/R site which is malfunctioning when said respective T/R site which is malfunctioning is operating in said multisite mode.

17. The system according to claim 15, wherein said NSC routes communications between said respective T/R site that is malfunctioning, and said control point system.

18. The system according to claim 15, wherein said site control processor is responsive to elimination of said malfunction to cause termination of said multisite mode of operating by said respective T/R site which had been malfunctioning, and to cause at least one message to be communicated from said respective T/R site to said control point system to re-establish participation of said respective T/R site in said simulcasting communication session.

19. A method for enhanced bypass operation in a simulcast radio communication system, comprising:

simulcasting from a plurality of transmit/receive (T/R) sites in a simulcasting communication session in which a common signal is broadcast wirelessly at the same frequency synchronously from a plurality of transmit/receive (T/R) sites to a plurality of mobile radio units dispersed in a plurality of coverage areas respectively associated with each of the T/R sites, said T/R sites responsive to a control point system controlling simulcast operations thereof;

responsive to a determination of a malfunction at a first T/R site of said plurality of T/R sites, automatically:

terminating participation of said first T/R site in said simulcasting communication session, without disabling the simulcasting communication session in progress at a remainder of the plurality of T/R;

communicating with a network switching center (NSC) using a packet switched network to register said first T/R site with the NSC as a multisite communication node, where the NSC is located remote from and is in communication with the control point system via the packet switched network;

reconfiguring said first T/R site to function in a multisite mode of operation in which said first T/R site transmits data during a non-simulcast communication session established with the NSC, where the data is transmitted at times and frequencies which are different from those employed by the remainder of said T/R sites participating in said simulcasting communication session; and reconfiguring at least one of said T/R sites still in simulcasting communication session to use a modified site timing offset which has been optimized for a scenario in which said first T/R site functions in said multisite mode;

wherein the NSC selectively addresses dispatch data directly to the first T/R site when the first T/R site is in a multisite mode of operation.

20. The method according to claim 19, further comprising:

responsive to elimination of said malfunction automatically terminating said multisite mode of operating by said first T/R site; and reconfiguring said at least one T/R site still in said simulcasting communication session to discontinue use of said modified site timing offset and to revert to a site timing offset optimized for a scenario in which said first T/R site is functioning in simulcast mode.

* * * * *